Nov. 6, 1928.

F. C. MOCK

SHOCK ABSORBER

Filed Aug. 1, 1924    5 Sheets-Sheet 1

Road Profile

Velocity of Axle Vertical

Vertical Acceleration of Axle or Body

Travel of Axle with respect to Body

Travel of Body with respect to level ground.

Witnesses:

Inventor
Frank C. Mock
By Brown, Boettcher & Dienner
Attys

Nov. 6, 1928.

F. C. MOCK

SHOCK ABSORBER

Filed Aug. 1, 1924

F. C. MOCK

SHOCK ABSORBER

Filed Aug. 1, 1924 5 Sheets-Sheet 4

Patented Nov. 6, 1928.

1,690,692

UNITED STATES PATENT OFFICE.

FRANK C. MOCK, OF CHICAGO, ILLINOIS, ASSIGNOR TO STROMBERG RESEARCH CORPORATION, OF CHICAGO, ILLINOIS, A CORPORATION OF ILLINOIS.

SHOCK ABSORBER.

Application filed August 1, 1924. Serial No. 729,459.

My invention relates to means for controlling the action of springs for vehicles, more particularly for motor vehicles.

Such devices are generally and incorrectly designated as shock absorbers.

In a vehicle having the elements of a running gear, a body and controlling springs therebetween, which may be termed in their simplest aspect as the axle, the frame and the spring, the function of the spring is to permit relative movement of the axle with respect to the frame so as to minimize the movement of the body with respect to a direct line of movement and also to maintain the wheels in contact with the ground to secure proper guiding and driving.

It is well known that where the wheel must rise to pass above an obstruction, the vehicle spring must be deflected, and this movement of the axle upward should be transmitted to the frame, not as a sharp shock or jolt, but as a pressure which will result in a rise of the body. In the same manner, the dropping of the wheel into a hole should be permitted by expansion of the spring without necessitating the dropping of the entire body at the same rate of speed and to the same extent.

A spring is a satisfactory medium to cushion the movement of the axle toward the frame; that is, transform the kinetic energy of the body with respect to the spring into potential energy in the spring, but the more nearly perfect the spring is as a spring, the more certain is it to cause an over-throw of the body due to the retransformation of potential energy of the spring back into kinetic energy of the body.

Whenever the wheel strikes a rise in the road, it is quite apparent that the body must eventually move upward to maintain its given position with respect to the axle, and a perfect spring would secure such movement, but it would, due to the inertia of the body, cause over-throw beyond the neutral position. The greater the inertia of the body with respect to the spring, the more slowly will the body rise under the action of the spring, but the greater will be the tendency to over-throw. Since the axle will tend to assume a definite position, with respect to the body, for a given load, it will be apparent at once that all control of the recoil of the spring or all deflection of the spring must be reckoned with respect to the given initial or loaded position.

I have conceived and proven by repeated demonstration that if it were possible to permit all flexing of the spring from the neutral position of the axle with respect to the body, whether above or below, to be as free from friction as possible, the pure spring function would be best preserved.

The neutral or loaded position of the spring is the position from which (above or below) the deflections in service are to be reckoned. However, the actual deflection from zero or completely unloaded position which this represents is a measure of the load which the body and its contents comprises. The greater the loading; i. e., deflection due to weight, the smoother will be the operation of the springs, assuming that a proper play is presented; i. e., distance between spring and frame.

Now, since the spring has been deflected to the neutral position by the weight, it will be apparent that spring pressure and the weight are equal and opposite.

In such a system, any change in position of axle with respect to frame, or vice versa, is bound to upset the balanced relation. If the axle moves nearer the frame, then the force or pressure of the spring is increased and since it is applied to a free body; i. e., the vehicle body, the vehicle body is impelled or accelerated upward.

In the case of a spring with a flat characteristic curve and a heavy body, the full limit of deflection may not be able, upon recoil, to throw the body up far enough to throw it beyond the actual zero point; i. e., to exceed the acceleration of gravity (where the passenger leaves the seat).

Now it will be apparent that if the axle drops down (body moves up) from neutral or loaded position, the body begins to lose the support of the spring by a certain amount, and to the extent to which the support of the spring is lost gravity begins to act. For example, assume that the axle dropped completely to zero or no load position, obviously the full force of gravity is allowed to act and accelerate the body.

Such a system; i. e., body, spring and axle, would, if not restrained, tend to vibrate with a frequency dependent upon the constants of the system, and engineers heretofore have directed their attention to attempts to damp out this vibration by interposing friction in the action of the spring as by increasing the friction between leaves or by external frictional means acting substantially uniformly over the range of spring action.

I have proven graphically and experimentally that the interposition of friction is erroneous and produces the wrong effect entirely. A stiffening of the spring by friction permits the axle to assist in pulling the body down into a hole; that is, it makes the downward velocity of the body greater, and then when the wheel starts out of the hole, the stiffening of the spring tends to secure a more rapid reversal of motion of the body, giving a worse jolt at the bottom. The same action accelerates the body upwards to a greater degree, resulting in worse over-throw out of the hole. So instead of softening the spring action, it stiffens it and makes it worse.

I also wish to call attention to the fact that this stiffening of the spring by friction opposes greater resistance to the driving of the vehicle over the road because the work which is done in moving the parts against friction comes from the driving engine.

The same inherent difficulty occurs in going over a short rise.

I am aware that it has been proposed to apply the friction to greater degree upon recoil of the spring than upon compression of the same. This action is in the right direction since it tends to permit easier deflection of the spring than expansion or recoil, but unless the resistance offered to the recoil be graduated in accordance with deflection, the action will be violent and jerky. This will be apparent from the fact that the pressure of the spring increases with deflection. If the friction be a constant, it cannot balance a variable force.

Also, I wish to call attention to the fact that the most common type of unequality of road is a hole and not a bump. This is particularly true of concrete and dirt roads and also of macadam after it is worn.

Now, if a constant added force is interposed to movement of the axle away from the body, the axle cannot drop into a hole without actually pulling the body more rapidly down with it.

Now, while a fluid friction; i. e., dashpot is ideal for spring control, and while I shall, in my co-pending application, describe and claim a suitable fluid device for securing the desired action, there is a demand in the trade for a suitable inexpensive and positive mechanical friction device which has a correct mode of operation for normal running conditions so that it will provide as easy riding as possible, be relatively permanent and will consume minimum power in driving the vehicle.

To this end, I have, in the present invention, provided a friction device which permits invariably free flexing of the spring by movement of the axle toward the frame, and which interposes a resistance graduated substantially in proportion to the deflection of the axle toward the frame above the neutral position of the axle and which presents substantially zero resistance for recoil of the spring beyond said neutral position so that the axle may freely drop below the neutral position.

The use of a mechanical friction shock absorber proceeds upon the theory of absorption of the energy of recoil of the spring in the work of moving the parts against friction. While this energy comes from the driving engine and is dissipated in heat and therefore lost and is not theoretically the best way, yet for practical purposes, if properly designed and applied, the device of my invention secures excellent results with minimum investment and complications.

In order that vertical throw of the body may not be increased by friction, I polish the spring leaves along their contacting surfaces and coat or plate them for the purpose of maintaining smooth anti-friction contacting surfaces. Their surfaces are well lubricated, this being best preserved by spring jackets.

The friction of the shock absorber is regulated so that only so much friction is employed as is necessary, and hence minimum jolting and power loss is encountered.

This takes account of all of the actions involved, except the rate of speed. With a given position of the frame with respect to the axle; that is, a certain clearance between the two for neutral position, the suspension should be stiffer for a higher rate of vehicle speed than for a lower rate of speed. This may be secured by bringing additional means into play in proportion to the speed; or means responsive to the rate of acceleration of the body against or with the action of gravity may be provided to compensate for variations in speed.

In order to acquaint those skilled in the art with the manner of constructing and operating my invention, I shall now describe, in connection with the accompanying drawings, a specific embodiment of the same.

In the drawings:

Fig. 1$^A$ is a diagram illustrating the action of the spring under different positions of deflection;

Fig. 2$^A$ is a cross sectional view of a spring embodying my invention;

Fig. 13 is a side elevational view with parts broken away to show the interior construction;

Fig. 14 shows a modification of the positional controlling mechanism;

Fig. 14$^A$ is a cross sectional view of a modified form of spring anchorage for the inner end of the spiral spring.

Figure 1:
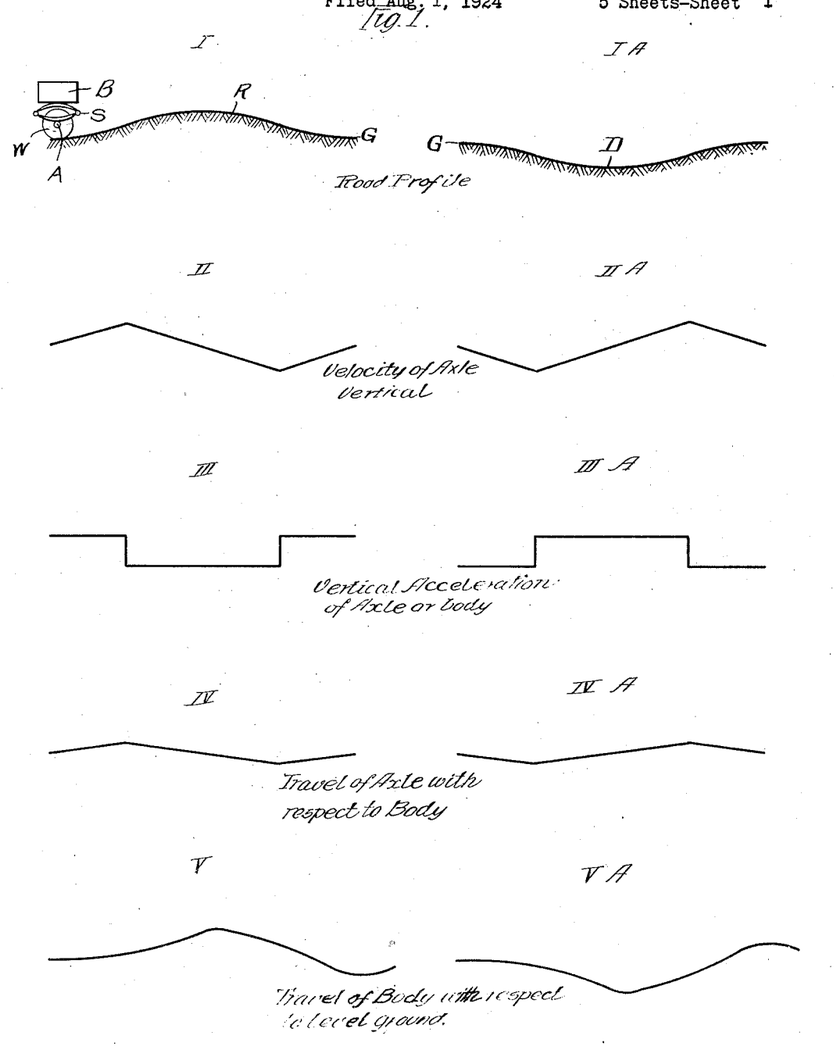
Fig. 1 is a diagram illustrating the action of the controller under different road conditions.

In the diagram illustrated in Fig. 1, assume that the vehicle having a body B, springs S and wheels W and axle A is driven over the ground illustrated by portions of the line G having a raised portion at R and a depressed portion at D. As the device is illustrated, there is a certain predetermined distance between the axle and the frame or body, and substantially this distance must be maintained if conditions of equilibrium are to prevail, and during such times as this distance is not maintained, there is a change in the equilibrium of the system or suspension of the vehicle. In the diagram of Fig. 1, the rise R and the depression D are assumed to be of sine wave form. This is a close approximation to usual conditions. Assume that the wheel encounters the beginning of the rise R, and it will be seen that the wheel is driven vertically under an accelerating force which is proportional to the rate of rise and to the velocity of the vehicle in a horizontal direction. When the wheel encounters the rise, the axle will be moved upwardly, flexing the spring S with the result that the pressure of the spring tends to raise the body B and the body B will describe an upward path determined by the influence of the spring, the force of gravity and its own mass. It will be seen that the path described by the body, while it does not include as sharp changes as the path of the axle, nevertheless, contains more changes in direction due to the vibration which is set up by the periodicity of the system which includes spring S.

It is desirable that the motion of the body should be gentle and should be characterized by as few changes in direction as possible. To this end, the movement of the body should be controlled by some means which presents a resistance to the throw of the body under the influence of the spring so that a line of movement of the body may travel a path which is characterized by gradual rise and fall of the body with respect to the axle and as free as possible from oscillations due to the vibration of the system.

In Fig. 1 I have indicated the graph of the profile of the rise R and graphs of the variable actions entailed by travel of the moving system thereover at a uniform horizontal velocity.

Graph I illustrates the character of the rise.

Graph II illustrates the vertical velocity of the axle. The actual rise of the axle with respect to a horizontal line, of course, is parallel to the road profile R.

Graph III illustrates the vertical acceleration of the axle by the character of the bump or rise R.

Graph IV illustrates the travel of the axle with respect to the body.

Graph V illustrates the travel of the body with respect to a horizontal line.

These graphs are all drawn for a given speed of relatively low value and would vary with different speeds.

Similar graphs have been drawn for the depression or hole D.

Figure 1A:
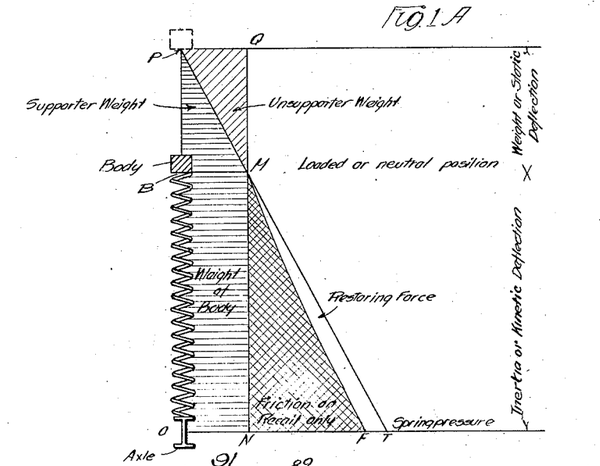

In Fig. 1$^A$ I have illustrated diagrammatically the relation between relative position of body with respect to axle and the accompanying or resulting spring pressure. In this diagram the independent variable; namely, axle movement toward body or vice versa, has been plotted along the vertical or Y axis and the dependent or consequent variable; namely, spring pressure, has been plotted along the horizontal or X axis.

When the spring is not compressed at all, the body is at P and the spring pressure is zero. At this point the spring does not support the body, the weight of which is represented by the distance P. Q., and if the body were not otherwise supported, the body would begin to move down under the force of gravity. But as the body moves down, the resistance of the spring increases in value as indicated by line P. T. This means that as the body encounters the increasing resistance of the spring, the body loses weight directly in proportion to spring pressure so that when the body reaches the point B the weight is just balanced by the spring pressure. Thus, in static condition the body loses weight in proportion to its movement toward the axle. The normal or loaded position is illustrated by line B. M.

Now, the entire deflection of the spring from P to O can be divided up into two parts; namely, parts P. B. and B. O. The part P. B. is the deflection due to weight. It may be termed the weight or static deflection. It represents the deflection due to the action of gravity upon the mass of the body B.

The part B. O. is the deflection of the spring which is due to kinetic action; namely, the effect of the inertia of the mass of the body. Now, it will be apparent that, for example, when the axle drops into a hole the body loses support of the spring, and to the extent which it loses spring support, it is free to act under the action of gravity and descend.

Naturally, the flatter the characteristic of the spring and the greater the initial or static deflection, the deeper is the hole that can be encountered for a given loss of support.

A curve of body travel or descent and ascent can readily be plotted by considering that the drop of the axle into the hole for a given increment of time permits a certain increment of loss of spring support and hence increment of gravitational force to bring the body down.

The acceleration of the body can readily be reckoned and plotted.

Now, however, in coming out of the hole the spring begins again to take up the weight of the body and the result is that the inertia of movement of the body must be overcome and the body must be accelerated upwardly to bring it to its position of static balance. According to my invention, I aim to absorb by frictional resistance a part of the energy stored in the spring, leaving only enough free or unopposed energy to cause movement back to normal or static balanced position and leaving the motion in the region of static deflection to be as free of friction as possible.

To this end I add, by the means hereafter disclosed, and claimed, friction as illustrated by the triangle MNF. The maximum friction is afforded on return of the spring from maximum deflection and the ratio is substantially preserved back to the normal position, as indicated. The side MF of the triangle MNF may be shaped according to any desired law to bring the body back to neutral as quickly and smoothly as possible.

Figure 2:
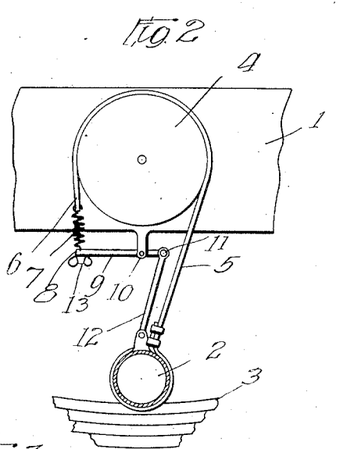
Fig. 2 is a side elevational view of a simplified embodiment of my invention.

In Fig. 2 I have illustrated a device embodying my invention. In this case the frame 1 is adapted to be connected to the axle 2 by a vehicle spring 3, which may be of the semielliptic or any other preferred type.

Figure 2A:
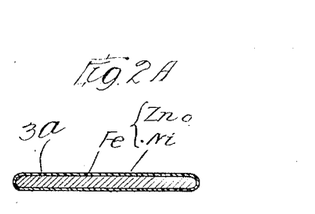

The spring 3 is made up of spring leaves 3ª, such as shown in Fig. 2ᴬ, having their outer surfaces polished and coated with a dense preservative material. For this purpose, I plate and buff the entire surface of each leaf of the spring. I may nickel plate, or galvanize or sherardize the surface of the spring leaves.

The axle 2 maintains for a given loading a substantially predetermined neutral position with respect to the frame 1. For flexing of the spring 3 corresponding to encountering a rise in the road bed, the axle 2 rises above its neutral position with respect to the frame 1, and upon encountering depressions in the road bed, the axle 2 drops below its normal neutral position with respect to the frame 1. The frame 1 has a stationary drum member 4 secured thereto in any convenient manner and a friction strap 5 is fastened to the axle 2 and passed over the drum 4. The free end or tail 6 of the strap is controlled by a suitable spring 7, the tension of which, when the parts are in the neutral position as shown, is substantially zero. The spring 7 is connected at 8 to the long arm of a lever 9 pivoted at 10, to the frame member or drum 4, the short arm of the lever 9 is pivoted at 11 to a strut 12, which, in turn, is connected at its lower end to the axle 2.

The operation of this device is as follows:— Assuming that the axle 2 maintains its neutral position with respect to the frame 1, the spring 7 at this time is under only sufficient tension to keep the parts in place. Assume that the wheel of the vehicle encounters a rise as shown in Fig. 1. As the axle rises, the strap 5 is slacked off on the right-hand side, as viewed in Fig. 2, and at the same time, the lever 9 is swung in a counterclockwise direction, the longer arm moving more rapidly than the shorter arm due to the leverage and, consequently, tending to drag the tail 6 of the strap 5 around in a counterclockwise direction faster than the strap is slacked off on the right-hand side. The result is the end of the lever and the end of the strap are separated, whereby the spring 7 is put under tension, this tension being increased for increased deflection of the spring 3 in substantially direct proportion to the deflection of said main vehicle spring. This action is not intended to and does not, in any material way, interfere with the free flexing of the spring 3, which is made to be as nearly frictionless as is practically possible, but merely places a suitable tension upon the spring 7 to correspond to the position of the axle 2 with respect to the frame 1. It is therefore clear that as the axle 2 rises, the spring 3 is flexed and the friction between the strap 5 and the drum 4 is set in proportion to the deflection of the main vehicle spring.

As soon as the vehicle spring 3 is flexed, it exerts an upward pressure against the body tending to throw the same upward. This upward motion of the body tends to occur at a rate which is a function of the pressure exerted by the spring and also a function of the mass of the body. Separation of the axle and frame will occur when the upward rate of the body 1 exceeds the upward rate of the axle 2 or the downward rate of the axle exceeds the downward rate of the body. This would naturally tend to occur as soon as the axle 2 stopped accelerating over the obstruction or the axle ceased to accelerate into a depression or when the body is thrown over a bump and the axle rides down on the remote side of the bump. It is desirable to control the throw of the body 1 with respect to the axle 2 if and when the spring and body separate from each other in the region marked Inertia or Kinetic deflection in Fig. 1A. Since the spring 7 has been put under tension in substantially direct proportion to the deflection of the axle 2 with respect to the frame 1, the resulting friction between the strap and the drum will be also substantially directly in proportion to the deflection of these parts with respect to each other. That is to say, for a greater deflection of the main vehicle spring 3, a greater friction is interposed to the restoration of the normal neutral position of the axle with respect to the frame 1, as indicated in Fig. 1A, which means either a dropping of the axle down or a throw of the body upward. As the body is moved upward by the expansion of the vehicle spring, the lever 9 is swung around in a clockwise direction, releasing the friction substantially in proportion to the movement thereof, or according to any desired law as determined by the spring 7, or the area of contact of band 5 and drum 4 or the coefficient of friction of these parts, so that when the parts reach the normal neutral position, a minimum of friction is interposed and this may be as low or as high as desired, in accordance with the adjustment of the tension of the spring 7 or the other variables for this position. Adjustment for the spring may be made as by means of the wing nut 13.

When the axle 2 drops down below normal neutral position, as it would in case of dropping into hole or depression D shown in Fig. 1, it is desirable to let the axle drop freely so that the body or frame will drop down at a relatively low rate. To this end, further movement of the lever 9 in a clockwise direction throws off or slacks off any tension on the spring 7 which might remain so that the axle may drop freely for all positions below normal or within the region marked Weight or Static deflection in the diagram of Fig. 1A. As above explained, the adjustment of the initial tension of the spring 7 and the extent of the leverage; that is, the ratio of the lever arm, may all be varied to shift the point of zero friction between the strap 5 and the drum 4 to either the exact neutral position, as indicated above, or at some point slightly above or slightly below or at any desired position. The simple mechanism shown in Fig. 2 is capable of furnishing the three desirable features above enumerated; namely, first, a free flexing of the spring 3 at all times; next, a graduated return resistance which is substantially proportional to the deflection of the main vehicle spring from its neutral position for all upward movement of the body with respect to the axle, this graduated resistance being a maximum for maximum deflection and being a minimum for the neutral position; and permitting free or substantially free expansion of the spring 3 and drop of the axle 2 below the normal neutral position. I believe that I am the first to provide a mechanism that will accomplish this desirable result, and in view of the fact that these three actions are necessary to a satisfactory control of the spring system of a vehicle, I desire to claim the same broadly and not to be limited to the details of construction which I have shown.

The same invention is embodied in the device shown in Figs. 3 to 8, although the mechanism is different, the device shown in Figs. 3 to 8 being an enclosed device.

Figures 3, 9, 10, 12:
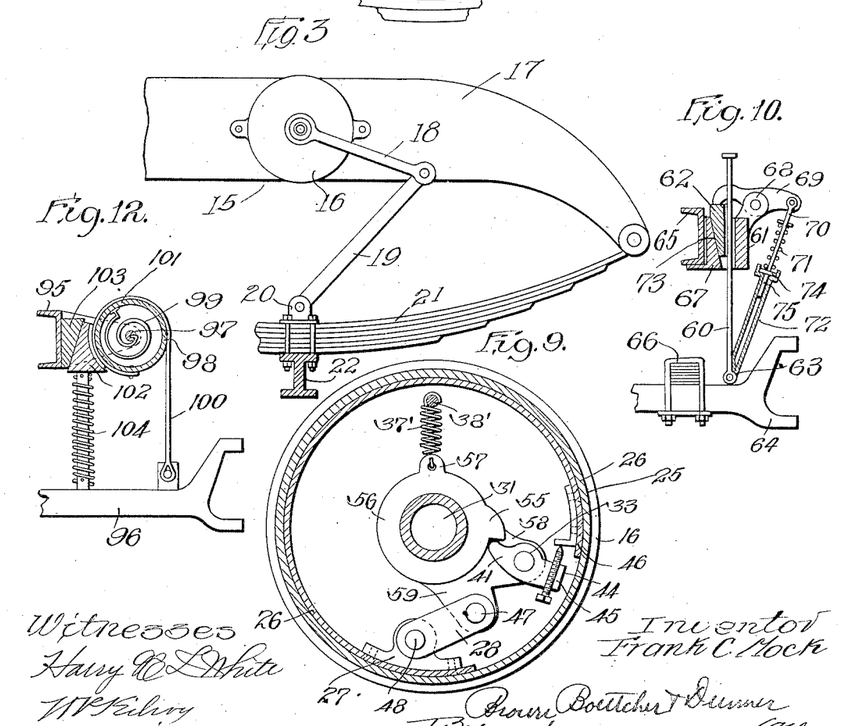
Fig. 3 is a similar side elevational view of the preferred form of my invention.
Fig. 9 is a view similar to Fig. 4 showing a modification.
Fig. 10 is a front elevational view partly in section showing a further modification.
Fig. 12 is a view of a modified form wherein the internal band is stationary and the drum is rotated by a strap and returned by a spring.

As shown in Fig. 3, the controller 15 has a drum-shaped body 16 which is mounted upon a frame member 17, and it has a pivoted arm 18 connected by a link 19 to a bracket 20 fastened upon the top of the spring 21 and thus secured to the axle 22. The spring 21 is suitably buffed, nickeled, polished and lubricated, as explained in connection with Figs. 2 and 2A. The drum 16 is secured by suitable lugs or ears 23 to the frame 17. The inside of the drum is lined with a suitable brake lining 25 which may be of fibrous material such as the usual brake linings made of asbestos or the like. A brake shoe 26, in the form of a thin spring steel band, engages the lining 25 and cooperates therewith to produce a frictional resistance to the movements of the parts later to be described. The band or shoe 26 has a lug 27 secured to its forward end, and to this lug there is connected, by means of the two side links 28, the arm 29 of a bell crank lever, the other arm of which is the external arm 18. The arm 29 has a central hub 30 which is secured to a central bolt member 31, this bolt having a head 32 recessed in the back plate 33 of the drum member 16 and having a cylindrical portion forming a bearing in a central boss 34 formed integral with the bottom plate 33. The housing or drum 16 has a cover fitting in the rabbet 16' Fig. 6 which closes the open side thereof and has a felt washer engaging the circular hub 30 to seal the inside of the drum against the entrance of dirt and moisture. The external surface of the boss 34 provides a bearing for the spring arm interior member 35 which has a hollow hub portion fitting on said cylindrical boss 34 and having a long arm which forms a connection at 36 for the tension spring 37, the opposite end of which tension spring is secured to a stationary pin 38, this pin being secured in the bottom plate 33. The spring arm 35 presents a radial and circumferential guiding means for the spring 37 to permit the spring 37 to be tensioned and to exert the desired effect upon the friction controlling lever 39. Thus, it will be seen that this member 35 constitutes, primarily, a lever for applying the force of the spring 37 to the friction controlling arm 39, and, in addition, it operates as a suitable mounting or carrier for the spring 37. The opposite end of the member 35 constitutes an arm 40 which engages the adjacent arm 41 of the lever 39. The lever 39 is pivoted at its central part on a pin 42 mounted in the arm 43, which arm 43 is integral with the boss 30 and thus with the arm 29.

Figure 4:
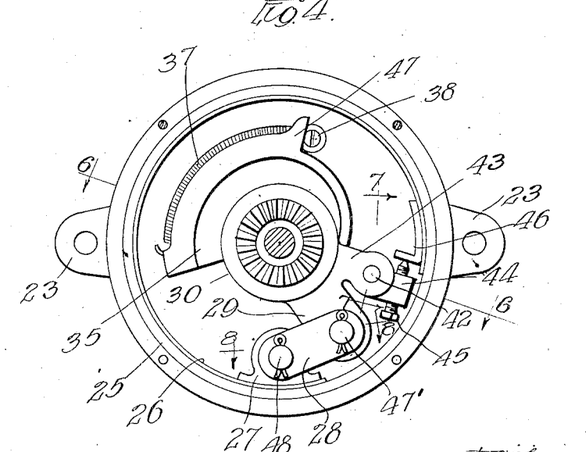
Fig. 4 is a vertical sectional view on the line 4—4 of Fig. 6 showing the interior parts in elevation.
Figures 5, 6, 7, 8:
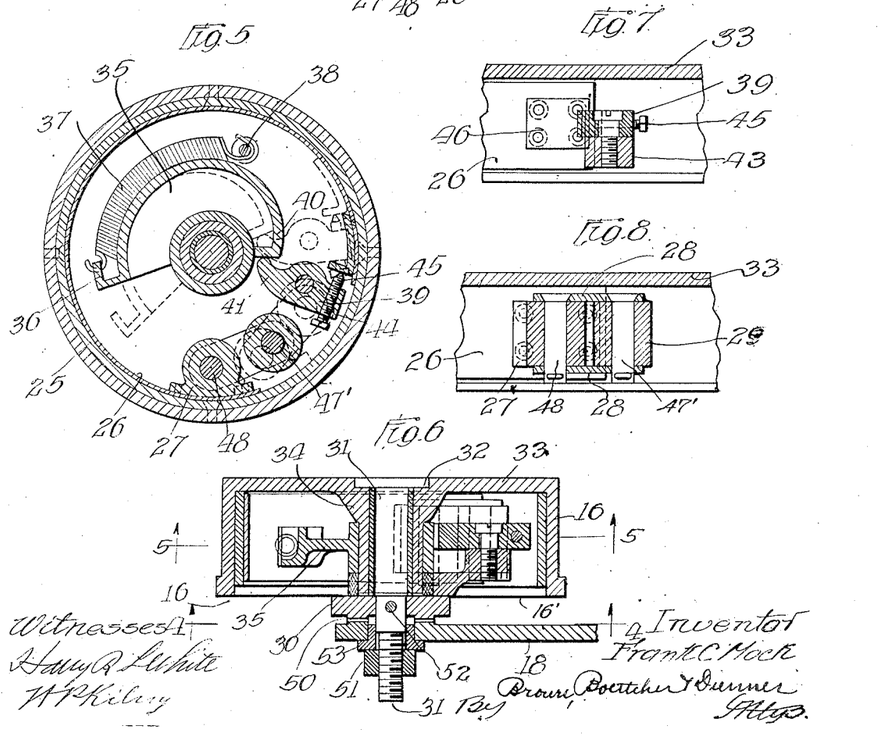
Fig. 5 is a similar section taken on the line 5—5 of Fig. 6.
Fig. 6 is a horizontal cross sectional view taken on line 6—6 of Fig. 4.
Fig. 7 is a fragmentary sectional view taken on the line 7—7 of Fig. 4.
Fig. 8 is a similar fragmentary view taken on the line 8—8 of Fig. 4.

The outer arm of the lever 39 is indicated at 44 and it bears an adjustable contacting screw 45 for engaging a lug 46, which lug is secured upon the tail end of the strap or shoe 26.

The spring actuated member 35 has a stop arm 47 which may engage the pin 38 to limit the motion of said member 35 so that the arm 40 and the arm 41 may be separated upon motion of the shoe or strap 26, as will be described later.

The arm 29 bears a pivot pin 47' which is mounted at a radial distance less than the radial distance at which the pivot pin 48 is mounted on the lugs 27. The result is that when the arm 29 is moved around in a clockwise direction, the links 28 transmit pressure in the line of the centers 47' and 48, giving a circumferential component and a radial component, this radial component tending to increase the friction. The motion of the strap or shoe 26 is further controlled by the pressure of the arm 39 upon the bracket or lug 46 on the tail of the strap, which, within certain limits of motion, is controlled by the spring 37 acting through its arm 40.

The arm 18 is adjustably connected to the hub 30 of the arm 29 by means of the clutch teeth 50 formed on the cooperating surfaces, these clutch teeth being held together by the nut 51 which is threaded upon the outer end of the bolt, the pin 52 which pins the hub 30 to the bolt 31 serving as a stop. A collar 53 between the nut 51 and arm 18 holds the lever 18 in alignment on said bolt 31.

Assume now that the parts are in the position shown in Fig. 3 and Fig. 4, the stop 47 being in engagement with the pin 38 so that any tension which may exist in the controlling spring 37 is no longer transmitted to the lever 39. Assume that the vehicle encounters a rise, as shown in the left-hand side of Fig. 1. Immediately, the tendency is to flex the vehicle spring 21 and to raise the end of the arm 18, swinging the hub 30 and the arms 29 and 43 in a counterclockwise direction. The arm 29 pulling through the links 28 at an angle upon the strap or shoe 26, pulls the strap 26 partly circumferentially and partly radially to collapse the same. At the same time, the inner arm 41 of the lever 39 engages the spring weighted lever arm 40 and begins to tension the coil spring 37, this tension being transmitted to the arm 44 and hence to the tail of the strap 46. This pressure, however, merely tends to push the strap around in a counterclockwise direction, assisting in the release of the friction so that the movement of the arm 18, and consequently deflecting of the main spring 21, encounters only the insignificant resistance of the small coil spring 37. Thus, the axle 22 is always free to rise toward the frame 17, this action being opposed, of course, by the vehicle spring 21 which must be flexed during such motion.

As soon as the frame 17 begins to rise with respect to the axle 22 under the recoil of the spring 21, clockwise motion of the brake shoe or strap 26 with respect to the drum 16 begins to take place, with the result that the pressure transmitted by the arm 29 through the links 28 tends to move the band 26 circumferentially and tends to force it out radially at the same time. However, the controlling spring 37 has been tensioned in accordance with the counterclockwise motion from the neutral position, and the further the movement in the counterclockwise direction, the greater is the stress under which the spring 37 stands, so that for greater deflection of the main spring 21, greater pressure is exerted by the spring 37 upon the tail end of the strap or shoe 26 through the intermediary of the arm 40, arm 41, arm 44 and pin 45. It will be apparent at once that any resistance offered to the movement of the tail end of the strap or shoe 26 is greatly multiplied by the expanding effect which is thereby produced. Therefore, upon the upward movement of the body or frame 17 with respect to the axle, a gradually decreasing resistance is interposed until the neutral position is reached, whereupon the spring 21 may expand freely, the resistance in the controller 15 at this time dropping to zero as the stop 47 engages the pin 38 to restrain the spring 37 from further action upon the strap 26. The stop 47 is not essential; it may be dispensed with if desired since, in the average vehicle, a sharp and distinct position for neutral cannot be maintained due to variations in loading of the vehicle, and, furthermore, the tension of the spring 37 need not be brought sharply to zero at this point since so doing tends to permit the spring to over-throw slightly. If desired, the spring 37 may merely slack off its tension at a given position without employing the stop 47.

For expansion of the spring 21 below normal neutral position, as, for example, when the wheel drops off of the edge of a hole or drops down to a lower level, as shown at D in Fig. 1, further clockwise movement of the brake strap or shoe 26 is accomplished without appreciable resistance since the angularity of the side links 28 is not great enough to cause binding between the shoe 26 and the lining 25. Hence, substantially free movement of the axle downwardly below the normal neutral position is permitted. If desired, a small spring tension by a separate spring may be imposed upon the lever 39 and hence upon the tail of the strap 26 to create a certain friction to downward motion, or the spring 37 may be permitted to act beyond the normal neutral position if desired. However, I find that the best action is secured by slacking off the controlling spring 37 at substantially neutral position and permitting the free drop of the wheel into a hole or to a lower level to occur without compelling it to drag the body down with it.

From the foregoing, it will be seen that both positional and directional control of the friction are required for satisfactory operation. The positional control must permit of substantially free dropping of the wheel below the normal neutral position for securing the desired action.

Instead of having a coiled spring 37 and a rotary lever or cam member 35 for engaging the arm 41 of the lever 39, I may provide a clock spring to permit of the degree of motion which is required by a device of this character, as will be seen for example in Fig. 12.

In Fig. 9 I have shown a modification in which the control of the tail of the strap 26 is considerably simplified. In this case, the directional or ratchet effect is obtained through the joint use of the controlling spring 37' and the eccentricity of the pin 48 with respect to the pin 47 about the central shaft or bolt 31. The positional control is secured through the tendency of the spring 37' to bring the controlling arm 55 to a predetermined position. In this form the pressure exerted by the spring 37' upon arm 41 does not follow a straight line law as the effective tension of the spring drops off rapidly toward zero. The arm 55 is mounted upon a central hub 56, which hub has an ear or short lever arm 57 connected through the spring 37' to the stationary pin 38'. Where insufficient room exists between the shoe 26 and said hub 56, the arm 57 may be suspended in a neutral position between the two ends of the spring, being attached to the center of the spring.

The arm 55 at its outer end rests in a recess 58 in the bracket 59, which bracket is mounted on the tail of the strap 26.

Now, it can be seen that when the parts are in the position shown in Figs. 3 and 9, movement of the arm 18 in a counterclockwise direction corresponding to flexing of the main spring 21 encounters no resistance between the shoe 26 and the lining 25 because of the tendency to collapse the strap or shoe 26, and the only force opposing such flexing motion of the main spring 21 is the tensioning of the controlling spring 37', which is of no consequence. Upon return motion, the friction between the shoe 26 and the drum 16 is controlled, as previously described, in accordance with the effective tensioning of the spring 37.

It will be noted herein that the spring 37' may be given an initial tension, but its effective tension on the arm 55 for normal neutral position is zero and this tension increases substantially with the sine of the angular position of the arm 57, and hence the angular position of the arm 55 about the central shaft 31.

Upon lowering of the axle and consequent clockwise motion of the arm 18 below the normal position, the spring actuated arm 55 remains stationary and the rocking or spring applying pressure arm 37 leaves said arm 55 so that no pressure is applied to the tail of the strap 26 and minimum resistance is encountered to lowering of the axle.

In Fig. 10 I have illustrated a modification in which a strut or bar 60 forms one friction element and the cooperating shoes 61 and 62 form the cooperating friction element. The strut or bar 60 is connected at its lower end preferably by pivotal connection, as indicated at 63, with the axle 64, this axle being connected to the frame 65 through the usual spring 66. The shoe 61 is formed as an integral part of a bracket 67 bolted or otherwise secured upon the side of the frame 65. This bracket 61 has lugs or ears 68 providing a pivot for the pressure applying lever 69, the outer arm of which is connected as by means of the rod 70 with a controlling spring 71, the rod 70 telescoping with a tube 72 which guides the same. The inner end of the lever 69 presses upon the top of the shoe 62, which is, in reality, a wedge cooperating with the portion 73 of the bracket, which provides a cooperating incline for the wedge 62. The angularity of the surfaces of the wedge and abutment 73 is such that it is relatively obtuse as compared with the coefficient of friction. That is to say, the friction between the shoe 62 and the rod or strap 60 is not great enough to make the surfaces of the wedge and abutment lock with respect to each other.

The operation of the device is believed to be apparent from the above description. In the normal neutral position, the spring 71 applies substantially no pressure to the wedge 62 and this may be controlled by the use of a stop 74 mounted on the rod 70, which stop 74 may be a collar or washer engaging a shoulder 75 on the lower end of the rod 70. Upon flexing of the main spring 66, the axle 64 approaching the frame 65, the strap or rod 60 is thrust upwardly between the shoes 61 and 62 to slack off the friction by raising the wedge 62. However, at the same time, the spring 71 is being compressed in accordance with the displacement of the axle with respect to the frame. However, the friction produced by forcing the wedge upwardly need be only great enough to produce a force which will counterbalance the spring 71 as this spring becomes stiffer and stiffer. The spring 71 is, however, relatively light with respect to the main vehicle spring 66, and any desired graduation of the effect of friction on the flexing of the main spring may be secured. Upon expansion of the main vehicle spring 66; that is, moving of the axle 64 back toward its normal position with respect to the frame 65, both the pressure of the spring 71 upon the wedge 62 and the dragging in or wedging effect of the friction of the shoes upon the strap or rod 60 are effected to create a pressure between said friction shoes 62 and 61 and the strap or friction rod 60. This dragging in effect, as controlled by the tension of the spring 71, decreases as the axle moves toward its normal neutral position and drops substantially to zero at the neutral position when the tension of the spring 71 no longer presses the wedge 62 into engagement with the strap 60 so that the axle 64 is free to drop below normal neutral position substantially without friction from the shoes 62 and 61, since the drag of the friction is insufficient to pull the wedge 62 into binding position. That is to say, the angle of the wedge 62 is so obtuse that its own weight and friction is insufficient to drag it into the bite of the abutment 73.

Figure 11:
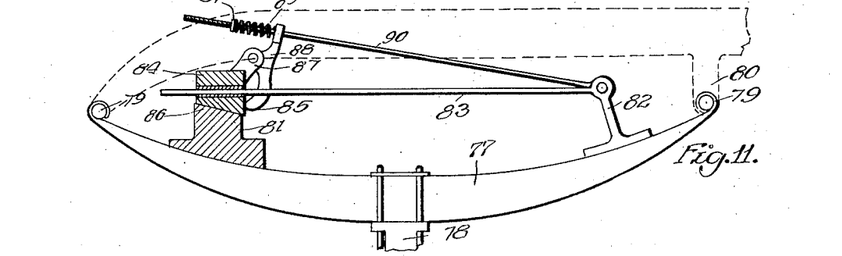
Fig. 11 is a side elevational view partly in section of a further modification.

In Fig. 11 I have illustrated the manner in which a device of this class may be directly embodied in the spring itself. In this case, the vehicle spring 77 is mounted upon the axle 78 and connected to the frame (shown in broken lines) in the usual manner. The ends of the spring are connected as by means of bolts 79 to a frame through a suitable shackle 80, which permits lengthening of the spring as it is flexed and shortening of the spring as it is restored. The spring leaves themselves are lubricated and are made to be as free of friction as practically possible as by smoothing off by grinding and then nickel plating and buffing. Upon the upper leaf of the spring I mount a pair of brackets 81 and 82, so arranged as to permit free movement of the ends of the spring away from each other, but to oppose return of these members toward each other until a normal neutral position is reached and with the friction depending upon the degree of deflection. Further expansion of the spring; that is, movement of the ends toward each other, is permitted freely so that the axle 78 may drop downward below neutral position, as above explained. The device for producing this effect is similar to the device illustrated in Fig. 10. It comprises a rod or strap 83 pivoted upon the ends of the bracket 82 and adapted to play between friction shoes 84 and 85, the shoe 85 being a wedge which is adapted to cooperate with a coacting wedge surface 86 forming part of the bracket 81. A lug 87 forms bearing for the lever 88, which is under the influence of a tension spring 89 to apply pressure to the wedge 85 tending to force it along the inclined surface 86 and into engagement with the strap or rod 83. This spring 89 is mounted upon a rod or carrier 90. the tension of the spring being suitably adjustable as by means of the nut 91 on said rod 90, the rod 90 being also pivoted to the end of the bracket arm 82 or otherwise moving with the main spring 77 in its contraction and expansion.

In the device shown in Fig. 11, assume that the axle 78 moves up toward the frame. This is accompanied by separation of the brackets 81 and 82 and is magnified by the length of the brackets, the rod or strap 83 being pulled out of the cooperating jaws 84 and 85 tending to release the pressure of the wedge jaw 85 upon its inclined surface 86. At the same time, however, the spring 89 is placed under a tension which varies in accordance with the degree of deflection of the main spring 77, being greater for greater deflection of the spring and less for less deflection of the spring, all with respect to the normal neutral position which this spring tends to assume upon normal loading. Upon the movement of the axle 78 downwardly by recoil of the vehicle spring 77, the ends of the spring tend to approach each other and, consequently, the strap or rod 83 is thrust to the left, as viewed in Fig. 11, through the bite of the jaws 84 and 86, the pressure upon which is determined by the tension of the spring 89 and the inclination of the surface 86. The friction between the strap 83 and the shoe 85 tends further to pull the wedge into tighter engagement due to its cooperation with the inclined surface 86.

When the spring has recoiled to its normal neutral position, the tension of the spring 89 is slacked off and the further movement of the rod 83 is relatively unimpeded since, in this embodiment also, the inclination of the surface 86 is not great enough to drag the wedge 85 into binding engagement. The degree of friction which is offered to this movement is controlled by the inclination of said wedging surfaces, and the degree of friction which the strap 83 and the active faces of the shoes 84 and 85 present. Obviously, a small constant tension may be placed upon the wedge 85 to drive it into engagement for securing a certain amount of friction, or a constant spring tension may be exerted upon said wedge 85 to throw it completely out of engagement if desired, as will be understood by those skilled in the art.

I believe that I am the first to embody free rebound checking means directly in the spring itself.

It will be observed that in the forms heretofore shown, a rocking lever, such as the lever 9 shown in Fig. 2 and the lever 39 shown in Figs. 3 to 9, inclusive, and the lever 69 shown in Fig. 10 and the lever 88 shown in Fig. 11, is employed for securing a reversal of motion between one of the moving parts; namely, the axle or spring end or the like, and the friction applying means, but it is not essential that a separate lever be provided for this function since, by a proper arrangement of the elements, pressure may be employed to the friction controlling element while tension is exerted upon the friction element itself, or vice versa. For example, in Fig. 12 I have illustrated diagrammatically the manner in which this action may be secured without a separate lever. In this case the frame 95 and axle 96 are connected by a suitable vehicle spring (not shown). Upon the frame 95, there is mounted a relatively stationary pin 97 upon which is journaled the drum 98. The stationary shaft 97 and the drum 98 are connected by a restoring spiral spring 99 which tends to turn the drum 98 in counter-clockwise direction, as viewed in Fig. 12. A strap 100 is connected at its inner end to the drum 98 and at its outer end to the axle 96, so that upon separation of the frame and axle, tension is placed upon the strap 100.

The shaft or pin 97 is mounted upon a bracket 101 which is bolted upon the frame 95. An arcuate wedged shoe 102 is adapted to engage the portion of the strap which is wound on the drum to create a friction between the drum and said bracket for dissipating the energy of the main vehicle spring as it expands from flexed to neutral position. The bracket 101 has an inclined curved portion 103 against which the cooperating curved part of the wedge 102 bears. A suitable spring 104 is connected between the wedge 102 and the frame 96, so that when the axle 96 rises it tends to put the spring 104 under compression varying in accordance with the amount of displacement of the main vehicle spring. The spring 104 is substantially slacked off and without expansive power when the axle 96 has reached again its neutral position. Hence, the axle 96 is free to drop below its neutral position with very little friction since the inclined surface 103 is so steep as not to permit the wedge 102 to be dragged into the bite thereof. The spring 104 may, as a matter of fact, be put under tension for positions of the axle below the normal neutral position.

Figures 13, 14, 14A:
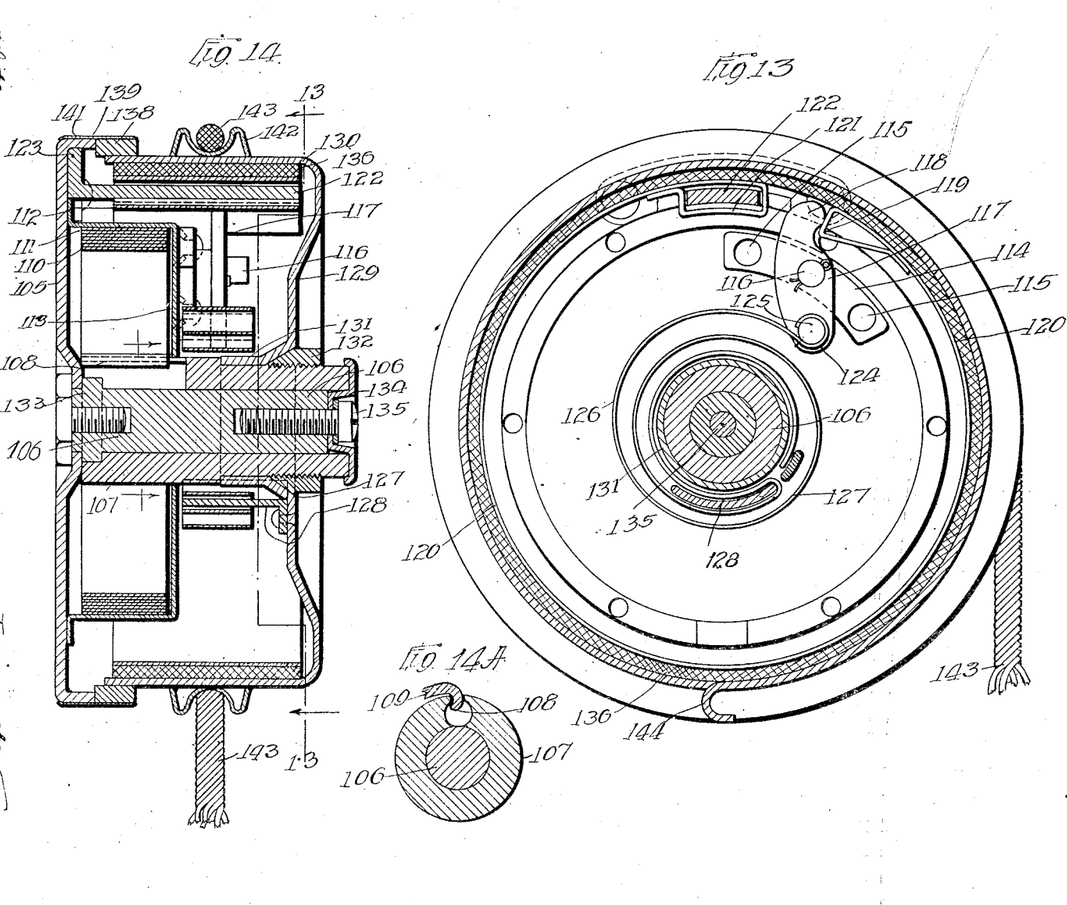

In Figs. 13 and 14, I have illustrated a form of device like that shown in Figs. 3 to 8, with the exception that the relatively movable parts of the first modification are in the modification of Figs. 13 and 14 relatively stationary. In this form a base plate 105 is mounted upon the frame and from this projects a bearing stud 106, which forms a mounting for the bushing or bearing 107.

The inner end of the bushing or bearing 107 has a keyhole slot 108 into which is hooked the end 109 of the clock spring or spiral spring 110, the outer end of which is connected to the base plate 105 through a metal housing 111 which has its rear end flanged, as indicated at 112, and riveted or welded to the base plate 105. The housing 111 has an inner head or plate member 113 upon which is mounted a bracket 114 as by means of the rivets 115, and this bracket supports a bearing pin 116 for the controlling spring lever 117, the outer arm 118 of which engages the end of the shoe or strap, as indicated at 119, this shoe or strap being shown at 120 and it consists of a spring steel band having a loop formed at its one end to form the contacting tail 119 and formed with a loop 121 at its front end, this latter loop hooking or threading loosely over the end of a stationary bracket 122, the foot or base of the bracket being riveted to the base plate 105, as indicated at 123. It is to be noted that the loop 121 which fits over the end of the bracket 122 is free to play radially, so that the end of the band may assume a proper position with respect to the inside of the drum. That is to say, the end of the band should float freely radially so that the entire surface of the band may be utilized to the best effect. The inner arm of the lever 117 is indicated at 124. It has a pin 125 projecting therethrough and this pin is passed through the eye formed in the end of the controlling spring 126, the end of the spring 126 being bifurcated to receive the end of the lever between the legs thereof.

The inner end of the controlling spring 126 is connected to a relatively movable part by being looped around the bushing 107 and held in the notch of a forked bracket 127, which bracket has its lower end 128 secured to the bottom wall 129 of the movable drum 130. The drum 130 has a central integral hub 131 which fits over the adjacent part of the bushing or sleeve 107 and rests against a shoulder and is secured to the bushing or sleeve by means of the threaded jam nut 132 which threads upon the bushing 107. The bushing 107 is, in turn, held in place between the integral collar 133 of the central stud or pin 106 and an outer flange 134 which is formed of a piece of sheet metal held as by means of the central machine screw and lock washer 135.

The drum 130 has a suitable lining 136 cooperating with the shoe or band 120. The edge of the drum 130 is sealed off by a felt washer or ring 138 which is held in place by a sheet metal ring 139, which ring is supported upon the flange 141 turned up from the edge of the base plate 105.

A sheet metal guide 142 in the shape of a grooved ring is mounted upon the exterior of the drum 130, and in the guide is mounted a cable 143, this cable being connected to the axle and the plate 105 being secured upon the frame, or vice versa. The end of the cable 143 is preferably secured to a struck up ear or lug 144 which forms a part of the drum.

In operation, the brake band or shoe 120 is relatively stationary and the drum moves with respect thereto, this drum being returned by means of the spiral spring 110. The spring 110 should be of a strength sufficient to take up the slack in the cable 143 by moving the drum in a counter-clockwise direction as viewed in Fig. 13. When the drum 130 is thus rotated in counter-clockwise direction as viewed in Fig. 13, the tendency of the band 120 to adhere to the friction lining 136 tends to result in a contraction of the band or shoe 120, thus releasing it from frictional engagement with said lining, so that the return motion of the drum and taking up of the slack of the cable is accomplished with a minimum of friction. At the same time that the drum 130 moves in the counter-clockwise direction, the bracket or arm 128, which moves with the drum, tightens up the convolutions of the clock spring 126 which controls the tension on the brake shoe 120 for return movement to put the same under greater tension for greater deflection of the main spring of the vehicle. The spiral controlling spring 126 puts an adjusted pressure upon the tail end of the shoe or band 120 in proportion to the deflected position of the spring, so that upon recoil of the spring; that is, the vehicle spring, a graduated resistance is afforded, as indicated in Fig. 1$^A$, through the range of spring deflection characterized as inertia or kinetic deflection.

Upon rebound of the body under recoil of the main spring a pull is exerted upon the cable 143. The drum 130 thereupon moves in a clockwise direction, as viewed in Fig. 13, the pressure of the spring 126 as exerted upon the tail of the strap or shoe 120 being controlled by the position corresponding to deflection of the main vehicle spring, so that for greater deflection the resistance afforded to movement between the shoe and the drum is controlled in proportion, whereby violent recoil of the main spring of the vehicle is prevented. It will be seen that the brake shoe 120 is of the automatic expanding type giving a high degree of friction in one direction of rotation of the drum and a low degree of friction for rotation of the drum in the other direction inherently. The friction which exists between the shoe 120 and the lining 136 is augmented on clockwise rotation of the drum, as viewed in Fig. 13, by the tendency to carry the free end of said band around peripherally with it and hence to cause it to expand radially into closer contact with said lining 136.

Figure 15:
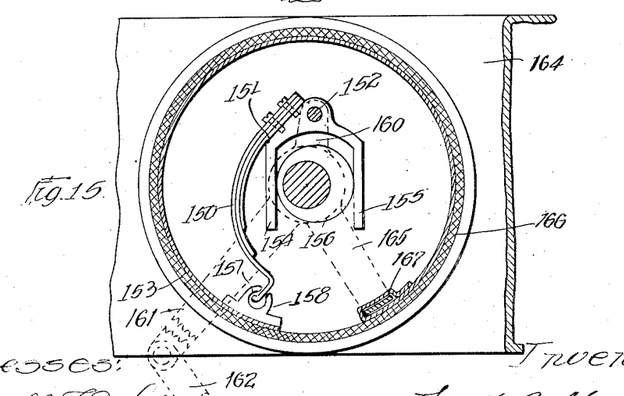
Fig. 15 is a cross sectional view of a modification in which a cam and leaf spring are employed for controlling the friction of the band.

In Fig. 15 I have shown a modified form of controller for the controlling spring. In this case a flat multi-leaf spring 159 is secured at its rear end to the yoke 151, this yoke being pivoted on a pin 152 which is relatively stationary or movable with the brake band or shoe 153. This controller may be employed in the form shown in Figs. 13 and 14, or it may be employed in the form shown in Figs. 4, 5 and 6. For the sake of clearness I have shown the same in Fig. 15 as employing a stationary drum and movable lever arm following the disposal of the parts in Figs. 3 to 6, although it is to be understood that the invention is not limited to the lever operation, but may employ the cable and return spring.

The yoke 151 has arms 154 and 155 lying upon opposite sides of the cam 156, this cam being connected with the drum so as to be responsive to the position of the axle with respect to the frame. The yoke 151 is pivoted by pin 152 to a short arm 160 of the actuating lever 161, said actuating lever having connection by means of link 162 with the axle of the vehicle. The drum 166 is mounted upon the frame 164 of the vehicle.

The lever 161 has a brake operating arm 165 extending out to a loop 167 on the end of the brake band 153. This loop permits the end of the band 153 to float freely radially, but ties the band 153 and arm 165 together for rotary motion with respect to the drum 166.

The outer end 157 of the controlling spring 150 is seated in a keyhole slot in the bracket 158 so that movement of the cam 156 with respect to the yoke 151, or vice versa, exerts a positive pressure in one direction or the other upon the brake shoe 153. By this mechanism it is possible for the cam to assist in moving the tail of the shoe or band 153 so as to collapse the band to permit free motion of the parts; that is, the band or shoe with respect to the drum, for motion corresponding to flexing of the main vehicle spring within the region designated as the inertia or kinetic deflection. Thus, in this form, the cam and yoke perform the function of collapsing the band, which, in the form shown in Figs. 3 to 8, was performed largely by the eccentricity of the pin 47 pulling through the links 28.

The spacing of the body of the vehicle away from the spring is assumed to be substantially normal in Fig. 15. As a result, the arm 161 is at or near the lower limit of its normal travel and spring 150 is flexed a minimum amount, placing the minimum pressure upon the tail of the shoe or band 153. This is because at the position shown the cam 156 has substantially its maximum throw with respect to the yoke 151. Motion of the body toward the axle occurs with substantially released friction of the device, and the friction is adjusted from substantially zero to any desired value as the vehicle spring is flexed, with the result that a maximum friction is opposed to return of the body when the flexing of the spring is a maximum.

I do not intend to be limited to the details shown or described.

I claim:

1. In combination, an axle, a vehicle spring and a frame, said axle having a predetermined neutral position corresponding to the normal loading and flexing of the vehicle spring, a pair of relatively movable friction members connected to said frame and axle, and controlling means including a spring for creating a pressure between said elements substantially in proportion to the flexing of the vehicle spring, and upon recoil of the spring from deflected position to neutral position only, and releasing pressure between said elements for all expansions of the spring beyond the neutral position of the axle to permit the axle to drop freely below neutral position.

2. In a vehicle having a frame, an axle and a vehicle spring, the combination of a rigid friction element and a flexible friction element, means for controlling the pressure between said elements to increase the friction for recoil movement only of the spring in accordance with the position of the axle above neutral position and to release pressure between said elements for all positions of the axle below neutral position.

3. In combination, a frame, a spring and an axle, a pair of friction members connected to the frame and axle, a controlling spring having limited play, this spring being adapted to present a graduated stress for variations in displacement of the frame and axle with respect to each other, and means including said controlling spring cooperating with one of said members for creating a friction between said members during and proportional to the stressing of said controlling spring and for releasing the friction between said members when the axle drops below a predetermined position with respect to the frame.

4. In a vehicle having a body and an axle connected by a vehicle spring, the method of controlling the movement of the vehicle body with respect to its axle which comprises interposing the resilient resistance of the spring only for all movement of the axle toward the frame, and opposing the recoil of the spring by a variable frictional resistance graduated in substantially direct proportion to the deflection of the spring above a predetermined neutral position and reducing said resistance to substantially zero for all expanded positions of the spring below said neutral position.

5. In a vehicle, the combination of a frame, an axle and a vehicle spring, said axle having a predetermined neutral position with respect to the frame, said position corresponding to a predetermined flexing of the vehicle spring, a pair of contacting friction members, connected to said frame and axle, and means including a controlling spring for varying the pressure between said members substantially in proportion to the deflected position of the axle with respect to the frame during the recoil of the vehicle spring toward neutral position and reducing the pressure between said members to substantially zero for all positions of the axle below neutral position.

6. In combination, a pair of movable members having a neutral position with respect to each other, a pair of friction elements connected to said members to offer a frictional resistance to a part of their movement, and means including a spring of limited displacement stressed in accordance with the displacement of the members with respect to each other in one direction from neutral for applying a graduated pressure to said elements to oppose return to neutral, the spring being ineffective for all movement of the members with respect to each other in the opposite direction from neutral.

7. In combination, a relatively stationary friction element, a relatively movable friction element, said movable element having four stages of movement from a neutral position, means including a spring stressed for creating friction between said members during one stage only of movement of said element, said spring being stressed to a variable degree by variable displacement of said member during another stage of movement of said member.

8. In combination, a relatively stationary friction element, a relatively movable friction element, said movable element having four stages of movement with respect to a neutral position, means including a spring stressed during one stage of movement for creating friction between said members during another stage of movement only, the stress of the spring decreasing with the movement in said other stage, said spring being relatively unstressed during the two remaining stages of movement.

9. In combination, a pair of relatively movable friction elements, said elements having four stages of movement with respect to a neutral position; first, a displacement in a positive direction; second, a return from positive displacement; third, a displacement in a negative direction; fourth, a return from a negative displacement, a spring stressed in proportion to the extent of said first movement only and relieved in proportion to the extent of the second movement, and means controlled by the stress of said spring for creating a graduated friction between said elements during said second movement only.

10. In combination, a pair of relatively movable friction elements, said elements having four stages of movement with respect to a neutral position; first, a displacement in a positive direction; second, a return from positive displacement; third, a displacement in a negative direction; fourth, a return from a negative displacement, a spring stressed in proportion to the extent of said first movement only and relieved in proportion to the extent of the second movement, and a lever, one arm of which is actuated by the spring and the other arm of which engages one of the friction elements for creating a graduated friction between said elements during said second movement only.

11. In combination, a pair of movable members, a pair of friction elements, a spring of limited displacement stressed during only a part of the motion between said members to impose a variable friction upon said elements, actuating means for the elements connected to said members and a lever, one arm of which is connected to the spring and the other arm of which is connected to one of the elements.

12. In combination, a drum, a flexible shoe thereof, an arm tending to rotate the shoe with respect to the drum, a radially floating connection between the arm and the shoe, a controlling spring of limited play, and a lever movable with the arm and cooperating with the spring to apply pressure to the shoe in accordance with the stress on the spring.

13. In combination, a drum, an internal band for the drum, an arm connected to one end of the band by a radially floating connection, a lever pivoted on the arm, said lever having one end thereof engaging the tail end of the band, and a spring having a less degree of motion than the arm for engaging the opposite end of said lever during a part of the travel of the arm with respect to the drum.

14. In combination, a drum having an internal braking surface, a band cooperating with said braking surface, a central bearing pin, a spring controlled arm pivoted on said pin, a connecting arm for the brake band having a toggle connection with one end of the band, a pressure applying lever carried by said actuating arm, said lever engaging the tail of the band and being controlled during a part of its motion by said spring controlled arm.

15. In combination, a friction drum having an internal friction surface, an expanding shoe adapted to cooperate therewith, an actuating arm for the shoe having a toggle connection therewith, a controlling lever carried by said actuating arm, and a spring controlled arm adapted to transmit a variable pressure to said lever to the brake shoe during a portion only of the movement of said shoe, said controlling spring having a limited displacement.

16. In combination, a drum having an internal brake surface, a cooperating expanding shoe, an actuating arm pivoted centrally of the drum for moving said shoe, said arm having a toggle connection with the shoe, a controlling lever carried in unison with the actuating arm, said controlling lever having one arm thereof engaging the expanding shoe, and a spring of limited displacement adapted to press upon the other arm of said controlling lever during a portion of the movement of said brake shoe only.

17. In combination, a brake drum having an internal friction surface, an expanding shoe adapted to cooperate therewith, an actuating arm for the shoe having a toggle connection therewith, a controlling lever carried in unison with the actuating arm, said controlling lever having one arm thereof engaging the shoe to cause expansion thereof, a spring actuated member for engaging the other arm of the controlling lever, said spring actuated member and said latter arm of the lever being in engagement during a portion only of the movement of said brake shoe.

18. In combination, a friction drum having an internal friction surface, an expanding shoe adapted to co-operate therewith, an arm for holding one end of the shoe and having a floating connection therewith, a controlling lever carried in unison with said arm, and a spring adapted to transmit pressure through said lever to the brake shoe during movement in one direction of said shoe relative to the drum for creating increased friction between the drum and shoe.

19. In combination, a frame member and an axle member connected by a vehicle spring and having a neutral position with respect to each other, a friction shoe connected to one of said members, a braking drum connected to the other member and a spring energized during downward movement of the frame member with respect to the axle member below neutral position for applying effective pressure to the shoe during upward motion of the frame member with respect to the axle member to neutral position only.

20. In combination, a brake drum, a brake shoe, means for moving the shoe and drum relatively with respect to each other throughout a fixed range of movement extending on each side of a neutral position, a spring, and means for causing the spring to increase the pressure between the shoe and drum in proportion to the relative displacement of the shoe and drum on one side only of the neutral position.

21. In combination, a brake drum, a brake shoe, means for moving the shoe and drum relatively with respect to each other throughout a fixed range of movement extending on each side of a neutral position, a spring, means for causing the spring to increase the pressure between the shoe and drum in proportion to the relative displacement of the shoe and drum in proportion to the relative displacement of the shoe and drum on one side only of the neutral position, and means to limit the action of the spring to prevent the application of pressure between shoe and drum for relative displacement of shoe and drum upon the other side of said neutral position.

In testimony whereof, I hereunto subscribe my name this 3rd day of July, 1924.

FRANK C. MOCK.